United States Patent [19]

Engelking et al.

[11] 3,887,200

[45] June 3, 1975

[54] ROTARY SEAL ASSEMBLY

[75] Inventors: Frederick S. Engelking; Donald F. Durham, both of Peoria, Ill.

[73] Assignee: Caterpillar Tractor Co., Peoria, Ill.

[22] Filed: Aug. 27, 1973

[21] Appl. No.: 391,861

[52] U.S. Cl. ................................................. 277/88
[51] Int. Cl. .......................................... R16j 15/34
[58] Field of Search .............. 277/87, 88, 92, 40, 42

[56] References Cited
UNITED STATES PATENTS

| | | | |
|---|---|---|---|
| 2,048,581 | 7/1936 | Weiher | 277/88 |
| 2,215,034 | 9/1940 | Gorman | 277/87 |
| 2,886,352 | 5/1959 | Krellner | 277/87 |

*Primary Examiner*—Robert I. Smith
*Attorney, Agent, or Firm*—Phillips, Moore, Weissenberger, Lempio & Strabala

[57] ABSTRACT

A rotary seal assembly includes torque-accommodating means for relieving a stationary seal from stress resulting from the application of excess torque to the stationary seal by an abutting rotating seal. The torque-accommodating means are employed in lieu of conventional keying means keying the stationary seal to a casing therefor, and include a pair of friction members disposed at either end of the stationary seal whereby excess torque is transmitted from the forward portion of the stationary seal to the rearward portion thereof and the stationary seal is permitted to rotate relative to said casing, thereby relieving stresses resulting from the excess torque.

4 Claims, 1 Drawing Figure

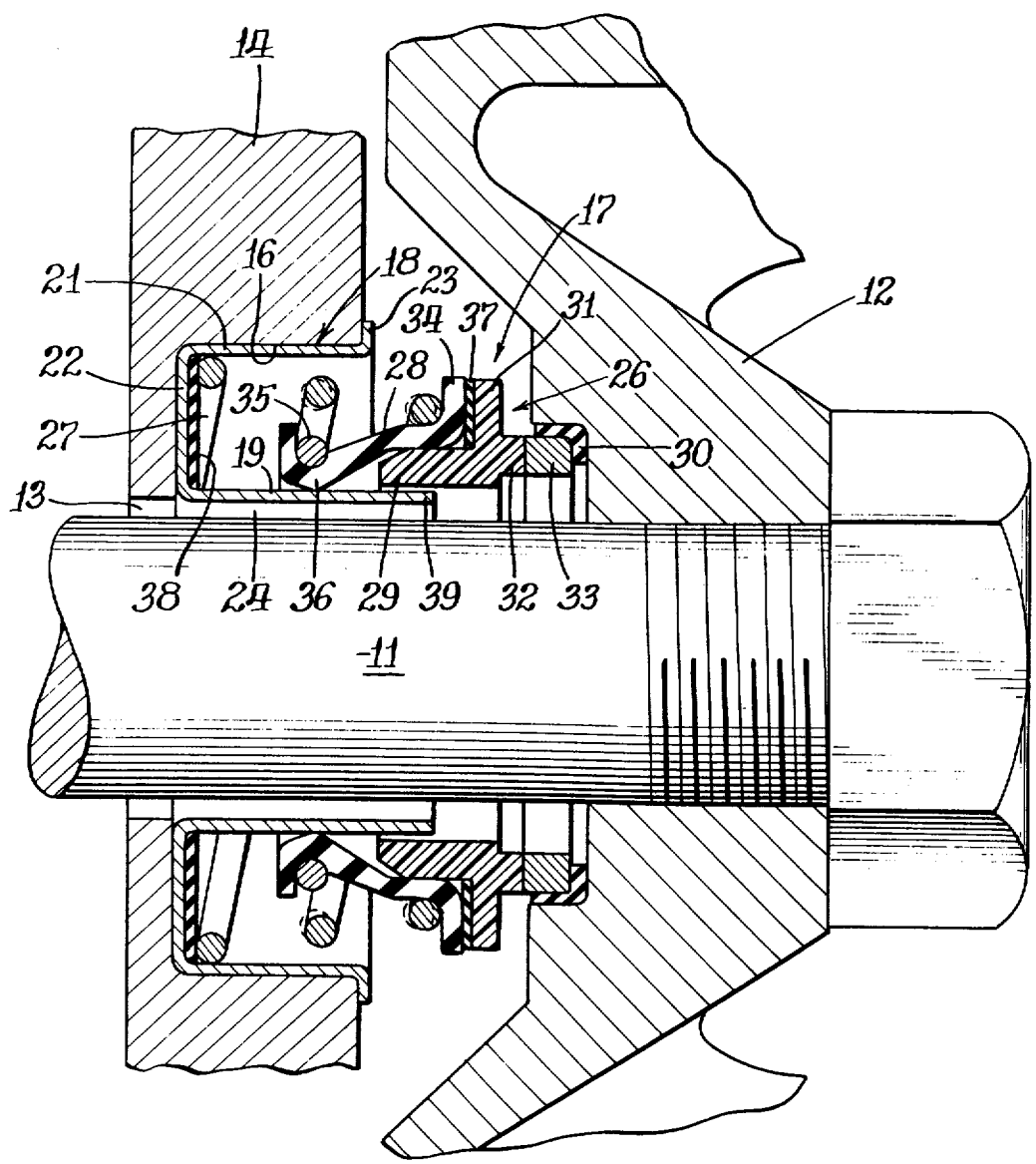

ROTARY SEAL ASSEMBLY

BACKGROUND OF THE INVENTION

This invention relates to a fluid seal assembly of the type commonly used in hydraulic pumps. This invention more particularly relates to a rotary fluid seal assembly for effecting a seal between a rotating shaft and housing therefor, wherein the assembly has improved means for preventing fluid leakage and for increasing durability of component parts.

Shaft seals in use today generally use a face seal member in conjunction with a bellows and spring to effect a seal between a rotating shaft and housing. Such seals are usually provided in the form of a cartridge or package-type assembly prefabricated at the factory in order that actual installation of the seal in mechanical equipment may be made with a minimum of effort and skill on the part of the operator.

In seal assemblies of the foregoing general type, an annular cup or casing serves as a carrier for the face seal member, spring, and bellows, and is adapted for press fitting engagement in a recess of the housing, with the central opening through the casing accommodating the rotary shaft. The face seal member is positioned at the forward end of the casing, and the spring, conventionally of the helical compression type, is disposed to act between a rear end wall of the casing and the face seal member so as to resiliently urge the latter axially against a rotating seal disposed on a hub of the shaft, when the assembly is installed, thereby effecting a rotary seal. Conventionally, a bellows or other rubber seal is utilized to prevent leakage at the rear portion of the face seal member.

Typically, the face seal member, bellows, and spring broadly comprise a stationary seal restrained against rotation by keeping means keying the seal to the casing. For example, the stationary seal is frequently keyed to the casing by means of lugs disposed on the casing which are sudably engageable with corresponding slots disposed on the stationary seal. In many instances, these keying means have proven to be disadvantageous; for example, since the rotating seal tends to transmit torque to the stationary seal, the frictional force created by the resistance of the stationary seal tends to wear down the lugs or other keying means over a period of time, occasionally wearing through the metal. When this occurs, the stationary seal is forced to turn, usually damaging the bellows seal and resulting in undesirable fluid leakage. Another problem frequently occurs when the metal of the lugs is worn through: the stationary seal becomes locked in the worn opening and cannot follow the rotating seal; the seal is thereby interrupted at this interface, and leakage results.

SUMMARY AND OBJECTS OF THE INVENTION

It is therefore an object of this invention to provide a rotary seal assembly having means for accommodating excessive torque exerted on the stationary seal whereby the integrity of the bellows seal may be preserved under this stress, and leakage prevented.

It is another object of this invention to provide a rotary seal assembly having means for accommodating excessive torque exerted on the stationary seal over a period of time, whereby the integrity of the seal at the interface of the rotating seal and stationary seal may be prolonged under this stress, and leakage prevented.

It is an additional object of this invention to provide a rotary seal assembly, including means for restraining rotary movement of the stationary seal in response to the urging of the rotating seal, which at the same time will accommodate excessive torque exerted on the stationary seal, thereby preventing damage to the bellows seal and interruption of the seal at the interface of the stationary and rotary seals.

It is a further object of this invention to provide a rotary seal assembly having an improved driving configuration which obviates disadvantages associated with conventional keying means such as lugs.

Accordingly, the invention broadly comprises a rotary seal assembly having an improved friction drive configuration. The rotary seal assembly includes torque-accommodating means for relieving the stationary seal of excessive stress comprising a pair of friction members which permit relative motion between the stationary seal and casing when excessive torque is applied to the stationary seal.

BRIEF DESCRIPTION OF THE DRAWINGS

The FIGURE is a longitudinal cross-sectional view of a rotary shaft and housing with a rotary seal assembly in accordance with the present invention installed in position.

DETAILED DESCRIPTION OF THE DRAWINGS

With particular reference to the FIGURE, there is shown rotary shaft 11, such as a water pump drive shaft, having a hub shown as impeller 12. The shaft is rotable in a bore 13 of a housing 14, such housing having a recess or counterbore 16 concentrically about bore 13, as is conventional in such structures.

In order to provide a seal against the passage of fluid between shaft 11 and wall of bore 13, a rotary seal assembly 17, in accordance with the present invention, is installed in housing recess 16 and operably associated with the shaft. The seal assembly 17 is most usually of the cartridge or package type prefabricated at the factory in order that actual installation of the seal assembly in mechanical equipment may be made with a minimum of effort and skill on the part of the operator.

The seal assembly 17 includes an annular cupped casing 18 which is adapted for press fitting engagement with the walls of recess 16, and serves as a carrier for other parts of the seal assembly. More particularly, the casing 18 includes an inner cylindrical tubular portion 19, an outer cylindrical wall portion 21 spaced coaxially outward from the inner tubular portion, and an annular end wall 22 interconnecting the inner tubular portion and outer wall portion. The free or forward end of the outer wall portion 21 is preferably formed with an outwardly flare annular flange 23.

With the casing thus provided, the outer wall portion 21 and end wall 22 are press-fit engaged with the peripheral and base walls of the housing recess 16, whereby such walls of casing 18 constitute one of the surfaces of the sealing assembly. The inner tubular portion 19 of casing 18 inwardly defines an opening 24 in coaxial alignment with housing bore 13 for traversal by shaft 11.

The stationary seal portion of the assembly generally comprises annular face seal member 26, compression spring 27, and rubber seal or conical-shaped bellows 28.

The face-seal member is preferably defined by a depending annular skirt 29 which terminates forwardly in an outwardly flared annular flange 31, which flange is formed with a raised annular nose portion 32 on its forward end face. Nose portion 32 serves to bear axially against the radial face of impeller 12 through the intermediary of rotating seal 33 of anti-friction, high-heat conductivity, wear-resistant material. In the usual situation, seal member 26 will preferably be a metallic material and seal member 33 will be carbon. Preferably, cup-shaped elastomeric washer 30 is disposed between impeller 12 and rotating seal 33.

In order to effect a fluid-tight rotary seal between face-seal member 26 and impeller 12, compression spring 27 is provided to resiliently axially urge the parts together. Spring 27 is helical and coaxially mounted in the annulus defined between the inner tubular portion 19 and outer wall portion 21 of casing 18 to act axially between rear end wall 22 and face-seal member 26.

Seal assembly 17 further includes bellows 29 of elastomeric material which is arranged to prevent fluid leakage from behind face seal member 26. The bellows is sealably secured at its opposite ends respectively to the face seal member 26 and casing 18 to thereby prevent fluid from passing there between. The bellows 28 is coaxially disposed about the inner tubular portion 19 of casing 18 and preferably formed at its enlarged end with an outwardly flared annular flange 34. The skirt 29 of face seal member 26 inwardly engages the enlarged end of bellows 28, and the rear face of the flange 31 thereof is juxtaposed to bellows flange 34. The compression spring 27 axially abuts bellows flange 34, which thereby transmits the spring force to the face seal member 26; a second compression spring 35 is radially loaded against lip 36 of bellows 28. The reduced end of bellows 28 includes a lip 36 which sealably engages the outer surface of cylindrical wall extension 19 of casing 18.

The conventional rotary seal assembly, described above is further provided with a pair of friction members 37 and 38, instead of the usual key arrangement to restain the stationary seal from rotating. One of the friction members 38 is disposed between end wall 22 of casing 18 and compression spring 27, and the other of the friction members 37 is disposed between flange 34 of bellows 28 and flange 31 of face seal member 26. Preferably, the friction members are of an annular disc configuration and composed of a suitable material to give suitable friction characteristics to resist rotation, but accommodate excessive torque.

The friction members 37 and 38 restrain rotation of face seal member 36 under the urging of the rotating seal, thereby taking the place of the keying means such as lugs ordinarily employed. Further, the friction members are capable of accommodating excessive torque applied to the stationary seal by permitting limited rotation thereof, thereby relieving stress on this seal and its component parts. In operation, rotation of impeller 11 causes rotating seal 33 to rotate against nose portion 32 of face member 26, and prevent leakage toward rotary shaft 11. If a predetermined torque is exceeded at the engaging faces of face member 26 and rotating seal 33, it is transmitted through friction member 37 and compression spring 27 to friction member 38. Relative movement may then occur either between face seal member 26 and boot seal member 28 with boot seal member 28 remaining stationary, or between compression spring 27 and casing 18 as friction members 37 and 38 accommodate excessive torque and permit the stationary seal members 26 and 28 to rotate in response thereto, with rear portion 36 of boot member 28 rotating relative to tubular portion 19 of casing 18.

Thus, preferably, under ordinary circumstances, the seal member 26 is restrained against rotation relative to boot member 28 by means of friction member 37 and the entire stationary assembly 26, 28 and spring 27 are restrained against rotation relative to casing 18 by means of friction member 38 and any friction that is developed betwen face portion 36 of boot 28 and the cylindrical extension 19 of the facing 18. Should the members 32 and 33 become temporarily stuck together such as by means of contaminants such as gum or rust, then member 32 will rotate with 33 preferably for a rotation or two until they become unstuck. This rotation will preferably occur without tearing or ripping the boot seal 28 as was common with the prior art device wherein the face seal member and the boot seal member are secured together to prevent relative rotation therebetween. Also, with the present invention, should some contaminant, such as gum, stick flanges 31 and 34 to the friction member 37 to prevent relative rotation therebetween, rotation will be permitted at face 36 and at friction disc 38 to thus maintain a seal until the other members become unstuck.

What is claimed is:

1. A rotary seal assembly comprising an annular cupped casing having an inner cylindrical tubular portion,
   an outer cylindrical wall portion spaced coaxially outward from said inner tubular portion, and
   an annular end wall interconnecting said inner tubular portion and said outer wall portion,
   an annular face seal member coaxially disposed about the free end of said inner tubular portion of said casing,
   a tubular resilient seal member having one end sealingly engaging said outer cylindrical wall portion and the other end engaging friction means for sealing and coupling said end of said tubular seal member to said annular face seal member,
   a compression spring coaxially disposed in the annulus defined between said inner tubular portion and said outer wall portion and resiliently acting axially between said end wall of said casing and the friction means acting on said face seal member, a rotating seal disposed between said face seal member and a hub of a rotatable shaft, and said friction means and said compression spring defining torque accommodating means for accommodating excess torque exerted by said rotating seal against said face seal member so that said face seal member is permitted to rotate relative to said casing and said tubular seal member to relieve resulting stress on components of said rotary seal assembly.

2. The rotary seal assembly of claim 1, wherein said friction means of said torque-accommodating means includes a pair of friction members, the first of said members being disposed between said face seal members and a forward portion of said compression spring, and the second of said members being disposed between said end wall and a rearward portion of said compression spring, said excess torque being transmitted from said first member to said second member through said compression spring thereby resulting in rotation of said face member and said compression spring to relieve stress on said rotary seal assembly and components thereof resulting from the exertion of said excess torque.

3. The rotary seal assembly of claim 1, wherein said friction means of said torque accommodating means comprises a friction disc disposed between the end of said compression spring and said end wall of said casing.

4. The rotary seal assembly of claim 1, wherein said friction means of said torque accommodating means comprises a friction disc disposed between one end of said compression spring and said face seal member.

* * * * *